Sept. 3, 1968   T. C. PENN ET AL   3,400,328
ANISOTROPIC FERROMAGNETIC THIN FILM MAGNETOMETER SYSTEMS
UTILIZING A MODULATOR TO PERTURB THE FIELD
ON THE SENSITIVE AXIS
Filed Feb. 24, 1964   3 Sheets-Sheet 1

INVENTORS
THOMAS C. PENN
JOSEPH A. RICE, JR.
BY
ATTORNEY

INVENTORS
THOMAS C. PENN,
JOSEPH A. RICE, JR.

United States Patent Office 3,400,328
Patented Sept. 3, 1968

3,400,328
ANISOTROPIC FERROMAGNETIC THIN FILM MAGNETOMETER SYSTEMS UTILIZING A MODULATOR TO PERTURB THE FIELD ON THE SENSITIVE AXIS
Thomas C. Penn, Richardson, and Joseph A. Rice, Jr., Austin, Tex., assignors to Texas Instruments Incorporated, Dallas, Tex., a corporation of Delaware
Filed Feb. 24, 1964, Ser. No. 346,860
9 Claims. (Cl. 324—43)

ABSTRACT OF THE DISCLOSURE

Disclosed are thin film magnetometer systems which utilize a modulator to perturb the field on the sensitive axis of the magnetometer to more easily detect weak external fields. In accordance with a preferred embodiment of the invention, the modulating signal is a square wave.

---

Figure 1:
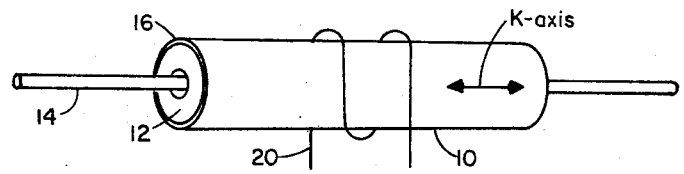

The present invention relates to highly sensitive instruments for detecting and measuring the direction and intensity of magnetic fields which may be either constant or rapidly varying with respect to time up to frequencies extending into the megacycle region and more particularly to an improved thin film magnetometer system wherein a modulator is utilized to deliberately perturb the field along the sensitive axis of the magnetometer to more easily detect weak external fields.

In U.S. Patent No. 3,239,754, assigned to the assignee of the present application, there is disclosed a thin film magnetometer which utilizes as a field sensitive element a thin ferromagnetic film characterized by a well defined uniaxial anisotropy. The thin ferromagnetic film defines either a general clylinder or a portion of a general cylinder, where a general cylinder is defined as the surface generated by a straight line moving around another straight line, the two lines always remaining parallel. The anisotropy axis of the film can be either parallel or normal to the axis of the general cylinder. The field sensitive element itself is encircled by a pick-up coil whose axis is parallel to the axis of the general cylinder. In accordance with one particular embodiment of the invention disclosed in the above identified patent, an alternating magnetic field $H_a$ is applied normal to the axis of the pick-up coil. In the absence of an ambient magnetic field, the net flux induced in the pick-up coil will be zero. If the field sensitive element is subjected to an ambient magnetic field in the plane of the film, a net flux proportional to the component of the magnetic field parallel to the axis of the pick-up coil will be produced. The voltage induced in the pick-up coil can be measured to provide an indication of the strength of the magnetic field.

The present invention provides an improved detection system especially adapted for a magnetometer utilizing field sensitive elements of the type described in the above patent. In accordance with one preferred embodiment of the present invention, the ferromagnetic film of the field sensitive element is formed with the anisotropy axis parallel to the axis of the general cylinder which the film defines. A modulating field is applied along the axis of the general cylinder and in the plane of the film. The peak magnitude of the supplied modulating field is less than the saturation level of the field sensitive element. A high frequency magnetic field applied perpendicular to the axis of the general cylinder is also provided. In the absence of an external magnetic field, the signal induced in the pick-up coil will be the second harmonic of the high frequency signal modulated at the frequency of the applied modulating field. The output of the pick-up coil is amplified and applied to an envelope detector. When an external ambient field is applied, the detected wave form will be altered in a manner such that a fundamental component plus odd harmonics of the modulation frequency occur. The phase relation between the fundamental component and the applied modulating field is determined by the polarity of the external field and the amplitude of the fundamental component will be proportional to the ambient field for small fields. The detected signal is applied to a phase detector which produces a DC signal proportional to the field strength. The polarity of the DC signal is indicative of the field polarity. In accordance with the preferred embodiment of the invention, square wave modulation is utilized to improve the signal-to-noise ratio of the system. If desired, the anisotropy axis may be normal to the axis of the general cylinder.

Figure 3:
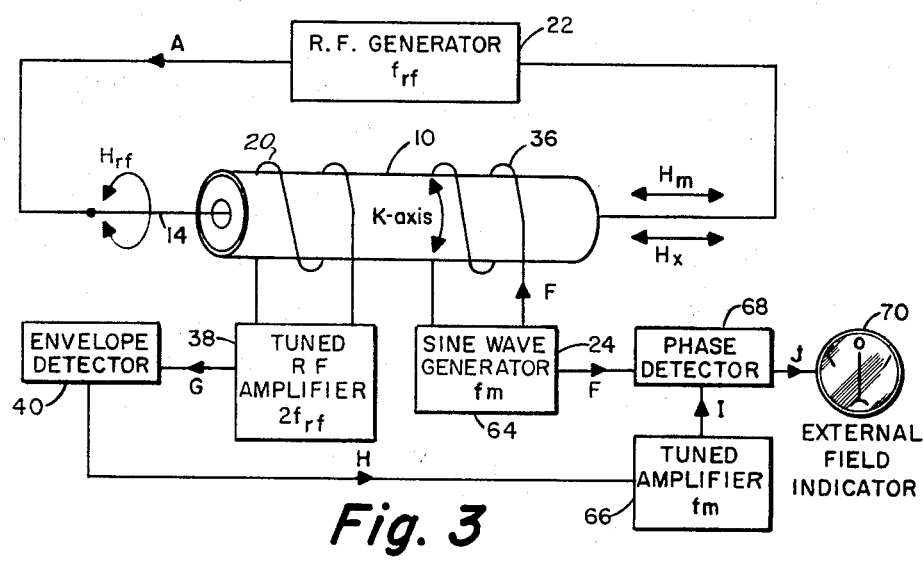
Figure 2:
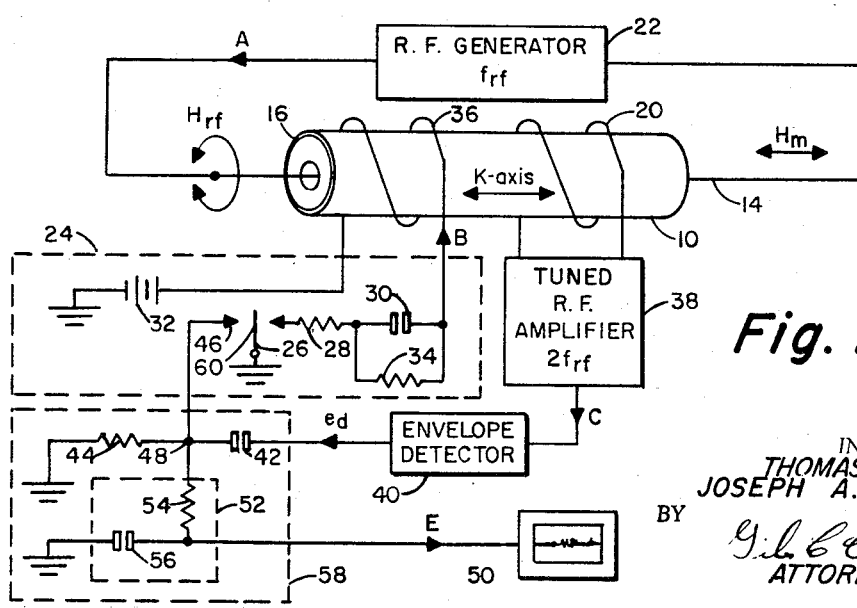
Figure 4:
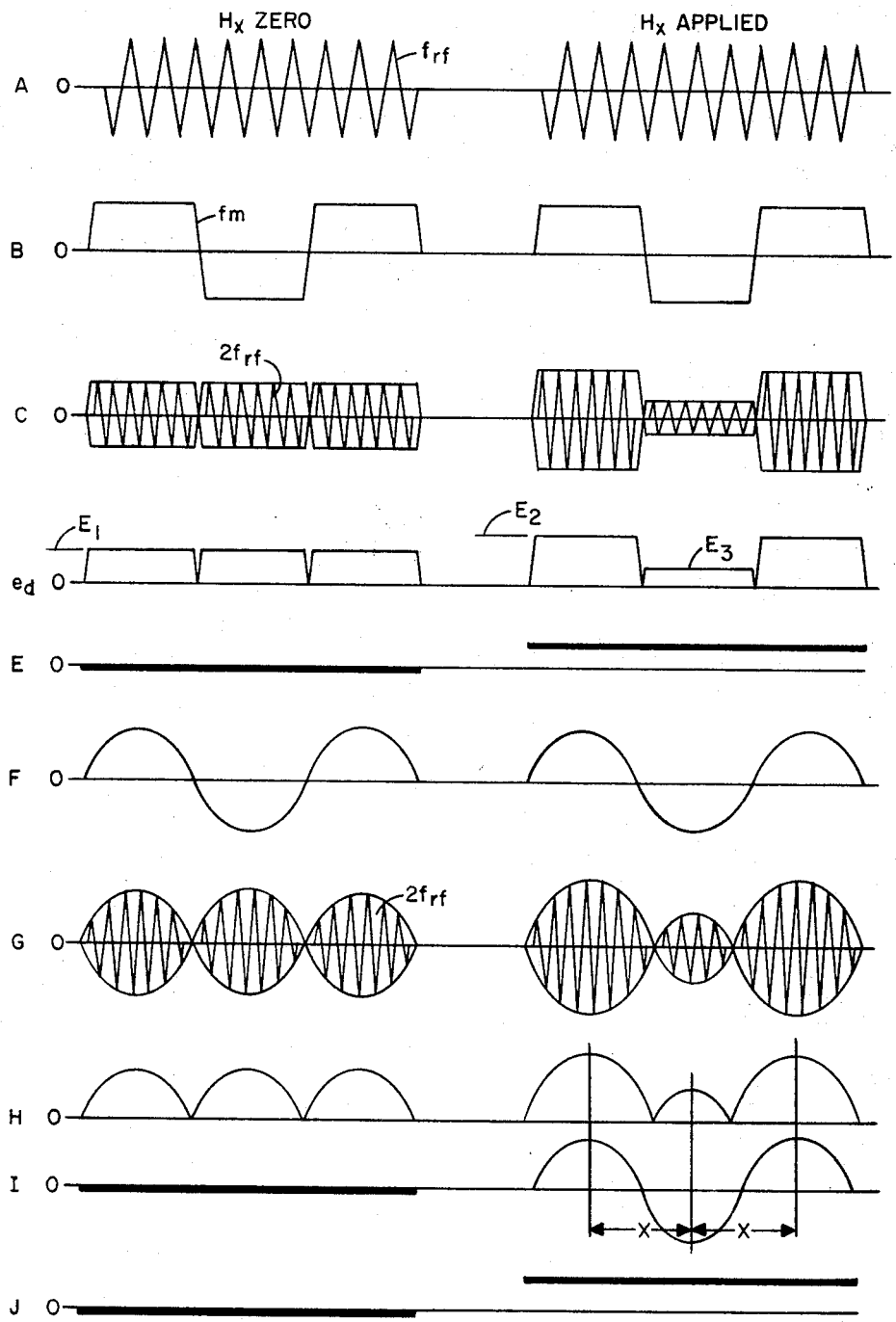
Figure 6:
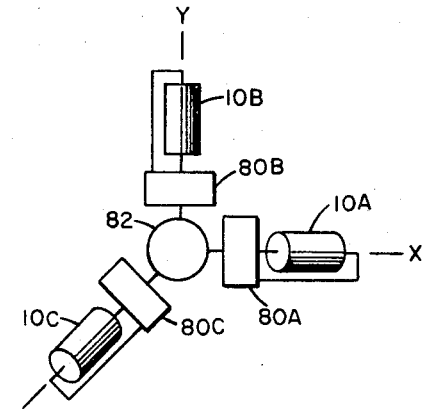
Figure 5:
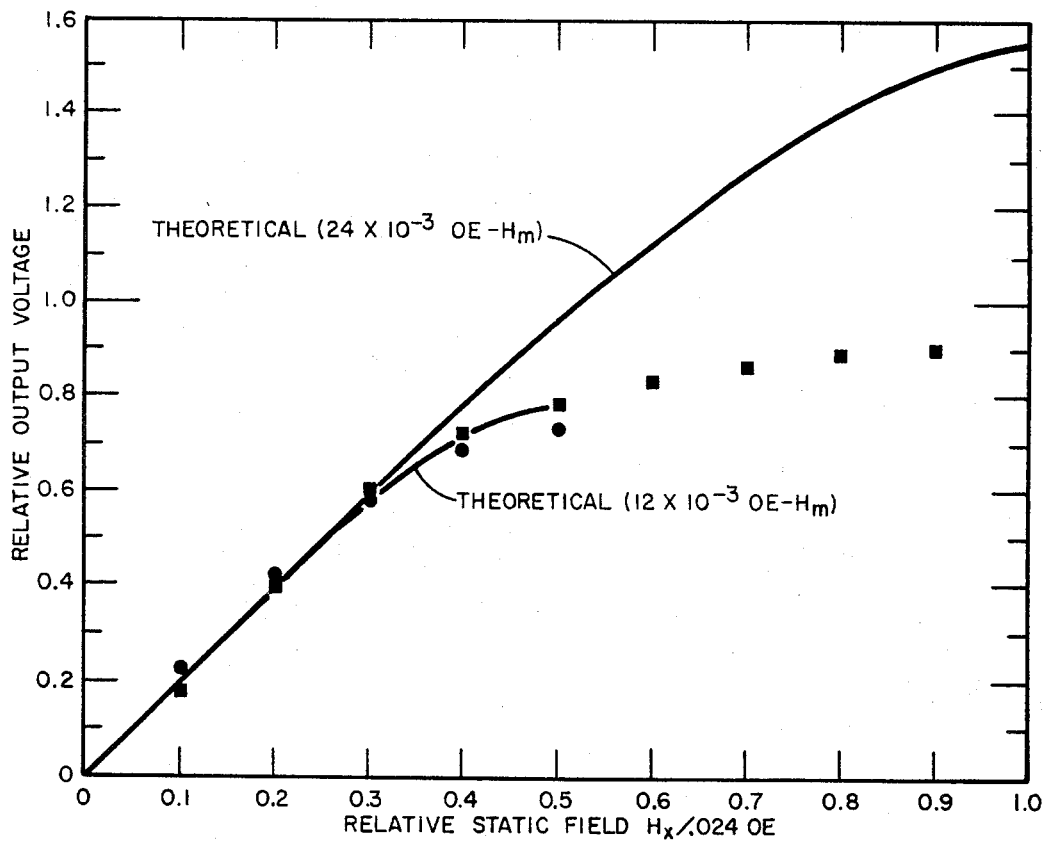

Many objects and advantages of the invention will become apparent to those skilled in the art as the following detailed description of the same unfolds when taken in conjunction with the appended drawings wherein like reference numerals denote like parts and in which:

FIGURE 1 shows a preferred type of field sensitive element to be utilized in practicing the present invention;

FIGURE 2 diagrammatically illustrates the preferred embodiment of the present invention;

FIGURE 3 diagrammatically illustrates another embodiment of the invention utilizing sine wave modulation;

FIGURE 4 shows the wave forms present in the circuits of FIGURES 2 and 3;

FIGURE 5 graphically compares theoretical curves with experimental data for different modulation levels; and FIGURE 6 diagrammatically illustrates the manner in which three orthogonally mounted units may be utilized to provide an indication of the total magnetic field.

Turning now to FIGURE 1 of the drawings, the preferred type of field sensitive element to be utilized in practicing the invention is shown. The field sensitive element 10 of FIGURE 1 is seen to comprise a tubular substrate 12, suitably of glass, having a conductor 14 passing along its axis. A thin ferromagnetic film 16 of nickel and iron, suitably having approximately 80% nickel composition, is formed onto the substrate in the presence of a magnetic field applied parallel to the axis of the cylinder to produce a film whose K-axis (anisotropy axis) is oriented parallel to the axis of the cylinder. A pick-up coil 20 is wound about the element as shown with the axis of the coil being parallel to the axis of the cylinder. It will be appreciated, however, that other field sensitive elements having different configurations but shaped to define a general cylinder or portion thereof in accordance with criteria set forth in the above referenced Patent No. 3,239,-754 may be utilized.

A magnetic detection system utilizing the above field sensitive element 10 is diagrammatically illustrated in FIGURE 2 of the drawings. As shown, an RF generator 22 which produces a high frequency output A of a frequency $f_{rf}$ is connected to the conductor 14 which passes along the axis of element 10. The conductor or coil 14 produces a circumferential field normal to the axis of the general cylinder which the film 16 defines. Generator 22 will, therefore, produce a high frequency magnetic field $H_{rf}$ which is parallel to the plane of the magnetic film and perpendicular to the axis of the element 10 and the K-axis of the film 16.

Several important advantages can be obtained by utilizing a square wave signal for modulation rather than a sine wave signal. One of the advantages is that a square wave can be generated very easily. A suitable circuit arrangement for generating a square wave signal which is uncomplicated and inexpensive is designated generally by the reference character 24. Such a circuit is seen to include a mechanical chopper 26 connected to resistor 28, a capacitor 30 and a battery 32. Resistor 34 is connected across the capacitor 30 as shown. As is well known in the art, such an arrangement will produce an alternating square wave B which is symmetrical about the point of zero potential, as shown in FIGURE 4. A coil 36, whose axis is parallel to the axis of element 10, is connected in a series with the elements defining the square wave generator 24. The square wave generator 24, when connected to the coil 36, will produce a magnetic field $H_m$ in the plane of the film and parallel to the K-axis. The frequency $f_{rf}$ of radio frequency signal A produced by RF generator 22 is much greater than the frequency of signal B produced by the square wave generator 64.

The pick-up coil 20 is connected to a tuned amplifier 38 which is tuned to a frequency $2f_{rf}$. The output C of the amplifier 38 is applied to an envelope detector 40 which suitably is a conventional diode detector. The output $e_d$ of the envelope detector 40 is connected through a capacitor 42 and resistor 44 to ground. The contact 46 of the mechanical chopper 26 is connected to the juncture 48 between the capacitor 42 and the resistor 44 as shown. The juncture 48 between the capacitor and the resistor is also connected to an indicating means, suitably a DC recorded 50, through a filter 52, which suitably comprises a resistor 54 and a capacitor 56. The filter 52, capacitor 42 and resistor 44 define a phase detector denoted generally by the reference character 58. The output E of phase detector 58 is a DC signal whose amplitude is proportional to the intensity of the ambient field $H_x$ and whose polarity indicates the direction of the field $H_x$.

The radio frequency generator 22 (typically 4.2 megacycles) supplies a magnetic field of amplitude $H_{rf}$ in the plane of the film perpendicular to the easy axis. In the particular field sensitive element shown, since the conductor 14 passes along the axis of the element 10, the thin magnetic film 16 will be equidistant from the conductor 14 at all points and the circular lines of magnetic flux produced by current flowing through the conductor will satisfy this condition. In similar fashion, the coil 36 has its axis parallel to the axis of the element 10 and since the coil is wound directly about the thin magnetic film, the lower frequency modulating field $H_m$ is applied in the plane of the film but parallel to the K-axis when the square wave generator 24 operates. In similar fashion, the sensing coil 20 also encircles the film and has its axis parallel to the K-axis. It will be noted that it is practical for the generator 24 to be connected to the coil 20, in which event the coil 36 can be eliminated.

The ferromagnetic film 16 is one which demonstrates magnetization reversal by domain rotation. When the magnetic field $H_{rf}$ is decreased from saturation in the hard direction (perpendicular to the uniaxial anisotropy axis), the film will split into roughly anti-parallel domains. The remnant state is a demagnetized one in which there is zero net flux along the K-axis. It will be noted that it is important that the sensing coil 20 be properly terminated. Otherwise, the field produced by the sensing coil if it should ring will render it impossible to achieve the demagnetized state.

Subsequent application of the field in the hard direction causes the magnetization axis to rotate within the separate domains such that the condition of zero net flux still applies. However, a small field $H_{ll}$ which may be the modulating field $H_m$ or the ambient field $H_x$ or both, applied simultaneously along the easy axis produces a net flux $\phi_{ll}$ proportional to the field $H_{ll}$ due to the fact that the total volume of the domains having the same sense as $H_{ll}$ is greater than that of the domains of the opposite sense. The field required to produce a given net flux can be related to the inhomogeneity in direction (angular dispersion) of the local anisotropy within the film. Assuming a gaussian distribution for the angular dispersion, a measure of the field $H_q$ required to produce a net flux equal to one-half that which would occur if the film were of single domain is $$H_q = H_k \sin \alpha_q$$

where $\alpha_q$ is the quartile value of the dispersion and $H_k$ is the field required to saturate the film in the hard direction (anisotropy field).

When the thin film is demagnetized in the above sense and no field other than $H_{rf}$ is applied, no voltage will appear across the pick-up coil 20. If any magnetic field having a component lying in the plane of the film and parallel to the axes of coil 20 is present, however, a voltage $e_{rf}$ will be induced in the sensing coil. The voltage $e_{rf}$ will be predominantly the second harmonic of the output A of generator 22. In the absence of an ambient field $H_x$ and with $H_m$ and $H_{rf}$ applied, the voltage $e_{rf}$ will be a double side band suppressed carrier signal consisting of the sum and difference frequencies of $H_m$ and $H_{rf}$. The out put C of amplifier 38 will be $e_{rf}$ in amplified form. The envelope detector 40 rectifies the output C producing the complex wave form $e_d$ which consists of the even harmonics of signal B. The capacitor 42 of phase detector 58 will be charged to a potential $E_1$ through the blade 60 and contact 46 of chopper 26. As long as the peaks of each cycle of the signal $e_d$ are substantially equal to $e_d$, no current will flow through resistor 4 and the output of the phase detector 58 will be zero.

When the ambient field $H_x$ is applied in the plane of the film and along the K-axis, it will be added vectorially to the modulating field $H_m$. Thus during one half cycle of $H_m$ the field $H_{ll}$ along the K-axis will increase and during the other half cycle the total field $H_{ll}$ will decrease in accordance with the amplitude of $H_x$. The voltage $e_{rf}$ and the output C of amplifier 38 will reveal that $e_d$ includes a component of the fundamental frequency $f_m$ whose amplitude is proportional to $H_x$. The amplitude of the fundamental component will be directly proportional to the difference between potentials $E_2$ and $E_3$.

If a pulse having an amplitude $E_2$ occurs when the blade 60 contacts contact 46, the capacitor 42 will be charged to the potential $E_2$. When the chopper blade moves to contact 62, the potential of output $e_d$ will fall to $E_3$ and the capacitor 42 will discharge through resistor 44 producing a positive voltage pulse equal to the difference in $E_2$ and $E_3$ across the resistor 44. During the next half cycle of the square wave signal, the capacitor will again be charged to potential $E_2$ through the chopper 26. Thus, a series of positive pulses of an amplitude proportional to the intensity of $H_x$ are produced. When the pulses are filtered by filter 52, a positive DC signal of an amplitude proportional to $H_x$ is produced.

The polarity of the DC signal would be reversed if the direction of the field were reversed. Thus, if the output $e_d$ of the envelope detector 40 were a potential $E_3$ when the blade touched contact 46, the capacitor 42 would only be charged to a potential $E_3$. During the next half cycle, the capacitor 42 would charge to a potential $E_2$ through resistor 44 producing a negative pulse of an amplitude equal to the difference between potential $E_2$ and $E_3$. The phase detector 58 will therefore produce a signal E whose amplitude is proportional to the intensity of $H_x$ and whose polarity indicates the direction of $H_x$.

Thus, it can be seen that no voltage will appear across the pick-up coil 20 provided that (1) the film is demagnetized by the field $H_{rf}$ as described previously, (2) the pick-up and RF driving coils are mutually orthogonal, and (3) no field other than $H_{rf}$ is applied. A voltage $e_{rf}$ which is predominantly the second harmonic of the radio frequency drive will be induced in the sensing coil, however, if either $H_m$ or the field to be detected $H_x$ or both is applied in the plane of the film and parallel to the K-axis. If $H_x$ is zero and $H_m$ and $H_{rf}$ are applied, the voltage $e_{rf}$ consists of the sum and difference frequencies of $H_m$ and $H_{rf}$. Rectification of $e_{rf}$ by envelope detector 30 produces a complex wave form $e_d$ having no component at $f_m$. When $H_x$ is not zero, however, an $f_m$ term appears in $e_d$, the amplitude of $f_m$ being proportional to $H_x$. The phase detector 58 recovers the direction of $H_x$ as well as its amplitude.

The theoretical dependence of $e_d$ on $H_x$ can be derived by first calculating, on the basis of Crowther's simple model (Lincoln Laboratory Group Report No. 51–2 (Feb. 24, 1959); revised Mar. 30, 1960) the net flux $\phi_{11}$ which results when an initially demagnetized film is subjected to a field H decreasing from saturation in the presence of a small field $H_{11}$. A Fourier expansion for $e_{rf}$ can then be obtained for the case:

$$H_\perp = H_{rf} \sin 2\pi f_{rf} t \quad (1)$$

and $\phi_{11}$ rotates reversibly between $$-\frac{\pi}{2} \leq \theta \leq \frac{\pi}{2}$$

where $\theta$ is the angle between the net flux and the K-axis. The result is that $e_{rf}$ is directly proportional to $H_{11}/H_q$ and contains only even harmonics in $f_{rf}$ when $H_{rf}=H_k$ and $H_{11} \leq H_q \ll H_k$. Finally, $e_d$ can be obtained by taking a Fourier expansion of the envelope of the second harmonic of $e_{rf}$ after half wave rectification when $H_{11}$ is replaced by $H_x + H_m \sin 2\pi f_m t$.

The final result is that $e_d$ contains both even and odd harmonics of the modulation frequency $f_m$. Since the detecting system shown in FIGURE 2 selects only the fundamental of the modulation frequency, all harmonics except the first can be neglected and the final equation may be written as $$e_d = A\pi^{-1}(2\beta + \sin 2\beta) \quad (2)$$

where $e_d$ is the amplitude of the term in $\sin 2\pi f_m t$. The dependence on $H_x$ is determined by the condition $\sin \beta = H_x/H_m$. The constant A is related to the properties of the ferromagnetic film, the radio frequency $f_{rf}$ and the modulation field $H_m$ through the relation $$A \simeq -2.5 f_{rf} C B_s V H_m H_q^{-1} \times 10^{-8} \quad (3)$$

where $B_s$ is the saturation inductance, V is the volume of the film and C is a constant approximately equal to the number of turns per centimeter for a well designed sensing coil times the effective gain of the amplifier detector system. Equations 2 and 3 are valid so long as $H_{11} \leq H_q \ll H_k$; $H_{rf} = H_k$; and $f_m \ll f_{rf}$. For the case where $2\beta \ll 1$ ($H_x \ll H_m$);

$$\frac{de_d}{dH_x} \simeq -\pi^{-1} f_{rf} C B_s V H_q^{-1} \times 10^{-7} \quad (4)$$

A measure of the sensitivity of the device can be obtained by assuming the gain of the amplifier detector system to be unity and assuming the constant C to be equal to the number of turns per centimeter ($n$).

In accordance with one specific example of the invention, the magnetic film was evaporated from an 83% nickel-17% iron melt for which $B_s=10^4 G$, $V=1.5 \times 10^{-5}$ cubic centimeters, and $H_q=.045 O_e$ ($\alpha_q=0.6°$). The RF frequency $f_{rf}$ was 4.2 mc. and $M=20$ turns per centimeter. The experimental sensitivity was 6 micro volts per micro oersted. The calculated sensitivity for unity gain using Equation 4 was 9 micro volts per micro oersted.

FIGURE 5 graphically compares calculated theoretical curves with experimental points with two values of $H_m$. Curve A is a theoretical curve for $H_m$ equal to $24 \times 10^{-3}$ oersteds, and Curve B is a theoretical curve for $H_m$ equal to $12^{-3}$ oersteds. The ■ shows experimental points for $H_m$ equal to $24 \times 10^{-3}$ oersteds and ● show experimental points for $H_m$ equal to $12^{-3}$ oersteds. The relative output voltage was obtained by normalizing the data for both values of $H_m$ by the same arbitrary signal level. The theoretical curves were adjusted to the same initial slope as the experimental points. The curves show that the initial slope is constant and independent of $H_m$ as predicted by Equation 4. The disparity at high levels was caused by saturation in a stage of amplification (not shown).

Turning now to FIGURE 3 of the drawings, there is shown a second embodiment of the invention wherein a sine wave is used as the modulating signal. The field sensitive element 10 of FIGURE 3 is identical in all respects to that used in the preferred embodiment except that the K-axis is formed normal to the axis of the pick-up coil rather than parallel. As previously noted, the K-axis of the film 16 can be formed either parallel or normal to the axis of the pick-up coil. A film wherein the K-axis is parallel to the axis of the coil appears to be more sensitive however.

If an element 10 where K-axis is normal to the axis of the pick-up coil is used, the field $H_{rf}$ will be applied along the K-axis. As the modulating field $H_m$ is much less than that required to saturate the film, the element will not become demagnetized in the sense referred to previously with respect to FIGURE 2. However, in the absence of a field $H_{11}$ parallel to the coil 20, the change of flux in the film is normal to the axis of the pick-up coil 20, the winding 20 is not intercepted by the varying flux, and the output from the coil is a minimum.

If, however, a magnetic field $H_{11}$ is applied perpendicular to the K-axis and in the film of the plane, the local domain magnetization vectors of the film are each pulled in the direction of the field $H_{11}$. Such a field $H_{11}$ changes the direction of magnetization by rotation of the magnetic dipoles in the plane of the film and this process occurs throughout the entire film. Thus, when a field having a value of $H_{11}$ is applied perpendicular to the K-axis in the plane of the film, the local domain magnetization vectors will each be pulled in the direction of the field $H_{11}$ and the reversal due to the alternating field $H_{rf}$ will take place partially by wall motion and partially by domain rotation. The domain magnetization vectors will then rotate in the plane of the film inducing a voltage in the pick-up coil. The induced voltage will be the second harmonic of $f_{rf}$. The amplitude of the second harmonic voltage will, of course, depend on the intensity of the component of the magnetic field $H_{11}$ normal to the K-axis, since as the magnitude of $H_{11}$ increases, a greater component of the magnetization vectors will rotate in the plane of the film.

It can be seen that the embodiment of the invention shown in FIGURE 3 is very similar to that shown in FIGURE 2. Thus, it includes the high frequency generator 22 which is connected to conductor 14 for providing a field $H_{rf}$ which is normal to the axis of the pick-up coil 20.

A sine wave generator 64 which produces a modulating signal F of frequency $f_m$ is connected to coil 36. The frequency $f_m$ of the modulating signal F is suitably much less than the frequency $f_{rf}$. A modulating signal applied to coil 36 will produce a modulating magnetic field $H_m$ which will be applied in the plane of the thin magnetic film and parallel to the axis of coil 20. The modulating magnetic field $H_m$ and the component $H_x$ of an ambient magnetic field applied in the plane of the film and parallel to the axis of coil 20 will produce a net flux which is proportional to the vector sum of the modulating field $H_m$ and the ambient field $H_x$. The voltage $e_{rf}$ induced in the pick-up coil 20 will be predominantly the second harmonic of $f_{rf}$ as described previously with reference to FIGURE 2. The pick-up coil 20 is connected to tuned amplifier 38 which is tuned to a frequency equal to $2f_{rf}$. The output G of amplifier 38 is applied to envelope detector 40, which produces an output H. The output H of the envelope detector 40 is applied to a tuned amplifier 66 which is tuned to a frequency $f_m$. The output I of amplifier 66 is the fundamental of $f_m$. The output I is applied to the phase detector 68, which drives the meter 70. As mentioned previously, the embodiment shown in FIGURE 3 is very similar to that described with reference to FIGURE 2. The principal difference, other than the use of a sine wave generator rather than a square wave generator, is the provision of tuned amplifier 66 which is connected to the output of envelope detector 40 and the requirement for a somewhat more complicated phase detector.

The tuned amplifier 66 is desirable as the ambient field $H_x$ causes many odd harmonics to be produced in the detected signal $e_d$ in addition to the fundamental. The tuned amplifier 66 is very sharply tuned such that it will attenuate the odd harmonics sufficiently that substantially only the fundamental frequency will be applied to the phase detector 68. Otherwise, the odd harmonics which are present may cause the phase detector 66 to produce an erroneous output. A reference signal from the sine wave generator 64 is also applied to the phase detector 68. The phase detector 68 compares the phase between the reference signal received from generator 64 and the signal applied received from the tuned amplifier 66 and produces a DC signal of an amplitude proportional to the intensity of the ambient field $H_x$ and of a polarity determined by the direction of field $H_x$. A somewhat more complicated phase detector than that shown in FIGURE 2 is required. However, suitable phase detectors are well known in the art and accordingly a detailed description will not be provided. Similarly, suitable amplifiers, detectors and signal generators are well known in the art.

As mentioned earlier, there are several advantages in utilizing a system wherein the modulating signal is a square wave rather than sine wave. Thus, as shown above, it is possible to reduce the number of elements required as an amplifier tuned to the frequency $f_m$ is not required and the square wave form is very easy to generate. In addition, the phase detection is somewhat easier using a square wave than if a sine wave is used. The principal advantage, however, in using a square wave for a modulating signal is that the signal-to-noise ratio of the system can be improved considerably. One of the principal sources of noise within the system is Barkhausen noise which is produced as the modulating signal changes polarity. The Barkhausen noise is much more significant at low signal levels. Since, as compared to a sine wave, the square wave passes through 0 very quickly as the polarity of the applied signal changes, the time at which Barkhausen noise can occur is reduced considerably, thereby reducing the energy due to Barkhausen noise, making it possible to provide a system having improved signal-to-noise ratios.

Three magnetic field measuring units of the type described above can be used to obtain an indication of the total ambient field if the precise direction of the field is not known. The field sensitive elements 10A, 10B and 10C of units 80A, 80B, and 80C, respectively, are mounted with the field sensitive axis of each element orthogonally related to the field sensitive axis of the other elements and lie in the $x$, $y$, and $z$ planes, respectively. The output E of each unit can be applied to a suitable computer for obtaining the quadrature of the magnetic field components and hence the total field.

Although the invention has been described with reference to particular preferred embodiments, many changes and modifications will become obvious to those skilled in the art in view of the preceding description. The invention is, therefore, intended only to be limited as necessitated by the scope of the appended claims.

What is claimed is:

1. Apparatus for indicating the intensity and polarity of an ambient magnetic field that comprises:
    (a) a thin anisotropic ferromagnetic film field sensitive element;
    (b) said field sensitive element being shaped to define at least a portion of a general cylinder and being uniaxially anisotropic along an axis in the plane of the film, said axis being one of the axes normal and parallel to the axis of said general cylinder;
    (c) means comprising an RF generator coupled to a coil having an axis normal to the axis of said general cylinder for inducing an alternating magnetic field of one frequency in the plane of said film and normal to the axis of said general cylinder;
    (d) means comprising a source of alternating current voltage coupled to a coil having an axis parallel to the axis of said general cylinder for inducing an alternating magnetic field of a second frequency in the plane of said film and parallel to the axis of said general cylinder;
    (e) said second frequency being lower than said first frequency;
    (f) a pick-up coil encircling said element and having an axis parallel to the axis of said general cylinder;
    (g) the voltage induced in said pick-up coil having a characteristic which varies as a function of the intensity and direction of a component of an ambient magnetic field in the plane of said film and parallel to the axis of said general cylinder;
    (h) detector means connected to said pick-up coil for producing an output signal of an amplitude proportional to the intensity of said component of said magnetic field and of a polarity dependent upon the direction of said component; and
    (i) indicator means connected to said detector means for indicating the intensity and polarity of said component of said ambient magnetic field.

2. Apparatus as defined in claim 1 wherein said anisotropy axis is parallel to the axis of said general cylinder.

3. Apparatus as defined in claim 1 wherein said anisotropy axis is normal to the axis of said general cylinder.

4. Apparatus as defined in claim 1 wherein said detector means comprises:
    (a) first amplifier means tuned to a frequency twice said frequency coupled to said pick-up coil;
    (b) envelope detector means coupled to said first amplifier means for producing a rectified output signal;
    (c) said rectified output signal of said envelope detector including a fundamental component of said second frequency in accordance with the intensity and polarity of said component of said ambient magnetic field;
    (d) phase detector means coupled to said envelope detector means and said second named means for producing a DC signal of an amplitude related to the fundamental component of said rectified output signal and of a polarity controlled by the phase relation between signals from said second named means and said envelope detector means; and
    (e) second amplifier means tuned to said second frequency connected between said envelope detector means and said phase detector means.

5. Apparatus as defined in claim 1 wherein said source of alternating current voltage is a square wave generator.

6. Apparatus as defined in claim 5 wherein said detector means comprises:
    (a) first amplifier means tuned to a frequency twice said first frequency coupled to said pick-up coil;
    (b) envelope detector means coupled to said first amplifier means for producing a rectified output signal;
    (c) said rectified output signal of said envelope detector including a fundamental component of said second frequency in accordance with the intensity and polarity of said component of said ambient magnetic field; and
    (d) phase detector means coupled to said envelope detector means and said second named means for producing a DC signal of an amplitude related to the fundamental component of said rectified output signal and of a polarity controlled by the phase relation between signals from said second named means and said envelope detector means.

7. A magnetometer for determining the intensity and direction of an ambient magnetic field that comprises:
    (a) three magnetic detector means;
    (b) each of said magnetic detector means including:
        (1) a thin anisotropic ferromagnetic film field sensitive element;

(2) said field sensitive element being shaped to define at least a portion of a general cylinder and being uniaxially anisotropic along an axis in the plane of the film, said axis being one of the axes normal and parallel to the axis of said general cylinder;

(3) means comprising an RF generator coupled to a coil having an axis normal to the axis of said general cylinder for inducing an alternating magnetic field of one frequency in the plane of said film and normal to the axis of said general cylinder;

(4) means comprising a square wave generator coupled to a coil having an axis parallel to the axis of said general cylinder for inducing an alternating magnetic field of a second frequency in the plane of said film and parallel to the axis of said general cylinder;

(5) said second frequency being lower than said first frequency;

(6) a pick-up coil encircling said element and having an axis parallel to the axis of said general cylinder;

(7) the voltage induced in said pick-up coil having a characteristic which varies as a function of the intensity and direction of a component of an ambient magnetic field in the plane of said film and parallel to the axis of said general cylinder;

(8) detector means connected to said pick-up coil for producing an output signal of an amplitude proportional to the intensity of said component of said magnetic field and of a polarity dependent upon the direction of said component; and (c) means for mounting the field sensitive element of each of said magnetic detector means in orthogonal relationship to the others.

8. A magnetometer as defined in claim 7 further including computer means connected to the detector means of said three magnetic detector means for computing the total ambient field.

9. Apparatus for indicating the intensity and polarity of an ambient magnetic field that comprises:

(a) a thin anisotropic ferromagnetic film field sensitive element;

(b) said field sensitive element being shaped to define at least a portion of a general cylinder and being uniaxially anisotropic along an axis in the plane of the film, said axis being one of the axes normal and parallel to the axis of said general cylinder;

(c) means for inducing an alternating magnetic field of one frequency in the plane of said film and normal to the axis of said general cylinder;

(d) means including a square wave generator for inducing an alternating magnetic field in the second frequency in the plane of said film and parallel to the axis of said general cylinder;

(e) said second frequency being lower than said first frequency;

(f) a pick-up coil encircling said element and having an axis parallel to the axis of said general cylinder;

(g) the voltage induced in said pick-up coil having a characteristic which varies as a function of the intensity and direction of a component of an ambient field in the plane of said film and parallel to the axis of said general cylinder;

(h) detector means connected to said pick-up coil for producing an output signal of an amplitude proportional to the intensity of said component of said magnetic field and of a polarity dependent upon the direction of said component; and (i) indicator means connected to said detector means for indicating the intensity and polarity of said component of said ambient magnetic field.

References Cited

UNITED STATES PATENTS

| | | | |
|---|---|---|---|
| 2,543,843 | 3/1951 | Frosch | 324—43 |
| 2,856,581 | 10/1958 | Alldredge | 324—43 |
| 3,012,177 | 12/1961 | Mortimer | 324—43 |
| 3,218,547 | 11/1965 | Sung Ching Ling | 324—43 |
| 3,239,754 | 3/1966 | Odom et al. | 324—47 |
| 3,271,665 | 9/1966 | Castro et al. | 324—43 |

FOREIGN PATENTS

| | | |
|---|---|---|
| 592,241 | 9/1947 | Great Britain. |
| 619,525 | 3/1949 | Great Britain. |

OTHER REFERENCES

Magnetic Field Measurement, IBM Technical Disclosure Bulletin, vol. 4, No. 6, November, 1961.

RUDOLPH V. ROLINEC, *Primary Examiner.*

R. J. CORCORAN, *Assistant Examiner.*